United States Patent [19]

Hutter

[11] Patent Number: 5,498,653
[45] Date of Patent: Mar. 12, 1996

[54] ROSIN CARBOXYPYRROLIDINONE ADDUCTS

[75] Inventor: G. Frederick Hutter, Charleston, S.C.

[73] Assignee: Westvaco Corporation, New York, N.Y.

[21] Appl. No.: 498,220

[22] Filed: Jul. 5, 1995

Related U.S. Application Data

[60] Division of Ser. No. 419,920, Apr. 11, 1995, which is a continuation-in-part of Ser. No. 352,385, Dec. 8, 1994, abandoned.

[51] Int. Cl.$^6$ .............................. C08L 93/04; C08F 2/24
[52] U.S. Cl. .................. 524/272; 106/30 R; 524/457; 524/764; 526/201; 526/203; 526/204
[58] Field of Search .................... 524/272, 457, 524/764; 526/201, 203, 204; 106/30 R

[56] References Cited

U.S. PATENT DOCUMENTS

| | | |
|---|---|---|
| 4,127,493 | 11/1978 | Elliott et al. . |
| 4,812,508 | 3/1989 | Maklouf et al. ................. 524/764 |
| 4,963,188 | 10/1990 | Parker . |
| 5,066,331 | 11/1991 | Hutter . |
| 5,152,832 | 10/1992 | Hutter et al. . |
| 5,208,319 | 5/1993 | Schilling . |

FOREIGN PATENT DOCUMENTS

| | | | |
|---|---|---|---|
| 1002336 | 3/1983 | U.S.S.R. .................... | 106/30 |

OTHER PUBLICATIONS

Floyd, D. E., *Polyamide Resins*, Reinhold Publishing Co., New York, 1958; Chapter 9: Inks (pp. 197–208).
*Encyclopedia of Polymer Science and Technology*, Interscience Publishers, John Wiley Sons, vol. 10, New York, 1969; Polyamides From Fatty Acids (pp. 597–615).

*Primary Examiner*—Peter A. Szekely
*Attorney, Agent, or Firm*—Daniel B. Reece, IV; Terry B. McDaniel; Richard L. Schmalz

[57] ABSTRACT

This invention relates to rosin carboxypyrrolidinone adducts. In particular, this invention relates to water-soluble resins derived from the reaction product of a modified rosin with a hydroxyl-containing carboxypyrrolidinone derivative. These resins can be used to make acrylic latex compositions which can, in turn, be utilized to produce water-based flexographic and gravure ink formulations.

6 Claims, No Drawings

ROSIN CARBOXYPYRROLIDINONE ADDUCTS

This application is a divisional of my commonly assigned, co-pending U.S. patent application Ser. No. 08/419,920 filed Apr. 11, 1995, entitled "Rosin Carboxypyrrolidinone Adducts"; which is a continuation-in-part of my commonly assigned, U.S. patent application Ser. No. 08/352,385 filed Dec. 08, 1994, entitled "Rosin Carboxypyrrolidinone Adducts" now abandoned.

FIELD OF INVENTION

This invention relates to rosin carboxypyrrolidinone adducts. In particular, this invention relates to water-soluble resins derived from the reaction product of a modified rosin with a hydroxyl-containing carboxypyrrolidinone derivative. These resins can be used to make acrylic latex compositions which can, in turn, be utilized to produce water-based flexographic and gravure ink formulations.

BACKGROUND OF THE INVENTION

Aqueous flexographic and gravure inks are widely used in the industry for a number of printing purposes, including printing on plastic packaging films. Resins used as vehicles for water-based flexographic and gravure ink formulations must exhibit certain properties such as solubility in water, wet adhesion to polypropylene film, hydrolytic stability, high melting points, and good pigment wetting.

Alcohol-soluble polyamide resins have been used extensively in inks for packaging and are commercially available. These polyamides are made from dimerized fatty acids and various polyamines such as ethylene diamine or hexamethylene diamine.

The use of such polyamide resins in ink compositions is described in Floyd, D. E., *Polyamide Resins*, Reinhold Publishing Co., New York, 1958 and in the *Encyclopedia of Polymer Science and Technology*, Interscience Publishers, John Wiley Sons, Volume 10, New York, 1969. A typical commercial product is GAX-340 manufactured by Henkel.

For water-based ink, a water-soluble resin such as acrylic resin or a conventional soluble maleic resin may be used. Acrylic resins have good film properties, but lack adhesion to polyolefin films.

Conventional soluble maleic resins, which contain half-esters, are subject to a certain degree of hydrolytic instability under alkaline conditions. They also lack film toughness.

Water-based ink compositions are taught in U.S. Pat. No. 4,963,188 to be prepared by free radical polymerization of rosin and maleic anhydride. Modification of the polymer with an alcohol or an amine prior to utilization in preparing the ink composition is disclosed.

Recently, water-soluble resins having qualities of adhesion and wettability for use in packaging ink compositions were developed as the reaction products of rosin modified by Diels-Alder reaction with an α,β unsaturated acid and a compound containing two secondary amine groups, including commercially available piperazine and N,N'-dimethylethylene diamine. These resins are described in U.S. Pat. No. 5,066,331.

These resins were developed primarily for use in water/isopropanol-based inks for printing on film, where they perform quite satisfactorily. When using these resins in all-water systems (i.e., no alcohol), it was found that the resin solutions had relatively limited shelf stability. In many cases the solutions gel upon standing for two or three days.

U.S. Pat. No. 5,152,832 corrected this gelling problem by teaching the use of a resin derived from the reaction products obtained by reacting a modified rosin with a compound containing two secondary amine groups, and further modifying said reaction products with a polyol (such as diethylene glycol).

However, a major problem exists with the employment of these resins. That is, these resins were found to be totally unsuitable for use as support resins for making acrylic latexes–forming excessive grit whenever these resins were utilized in this manner.

The present invention avoids this problem by teaching the use of a resin derived from the reaction products obtained by reacting a modified rosin with a hydroxyl-containing carboxypyrrolidinone derivative. Suitable hydroxyl-containing carboxypyrrolidinone derivatives are obtained by reacting itaconic acid with an amine and a polyol.

U.S. Pat. No. 5,152,832 (which is hereby incorporated by reference) teaches the production of carboxypyrrolidinones, which are subsequently reacted with alkenylsuccinic anhydrides to produce polyester lubricant additives. This patent does not teach or suggest the reaction of carboxypyrrolidinones with rosin or rosin derivatives.

Therefore, it is an object of this invention to provide water-soluble resins having for use in making acrylic latex compositions. These acrylic latex compositions may be utilized in formulating water-based flexographic gravure ink formulations.

SUMMARY OF THE INVENTION

The above object is met by resins derived from the reaction products of a rosin modified sequentially by reaction first with a member of the group selected from fumaric acid, maleic acid, maleic anhydride, itaconic acid, and itaconic anhydride and, second, with a hydroxyl-containing carboxypyrrolidinone derivative having one of the two following chemical structures:

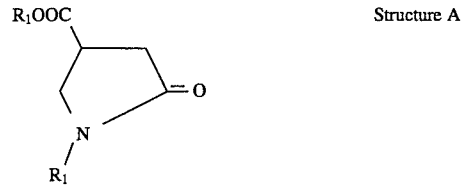

Structure A where $R_1$, independently, =H, $C_1$–$C_{20}$ hydrocarbyl, or $C_1$–$C_{20}$ hydroxyl-substituted hydrocarbyl; and at least one $R_1$ contains a hydroxyl group; or

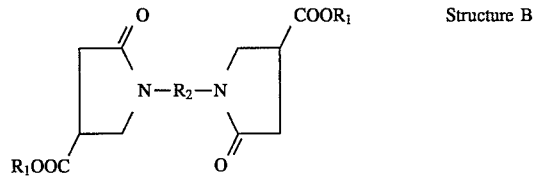

Structure B where $R_1$, independently, =H, $C_1$–$C_{20}$ hydrocarbyl, or $C_1$–$C_{20}$ hydroxyl-subtituted hydrocarbyl; and at least one $R_1$ contains a hydroxyl group; and $R_2$=$C_1$–$C_{36}$ hydrocarbyl or $C_1$–$C_{36}$ hydroxyl-substituted hydrocarbyl.

DESCRIPTION OF THE PREFERRED EMBODIMENT

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin.

It is generally known in the art that α,β-unsaturated acids and their anhydrides, such as maleic acid, maleic anhydride, itaconic acid, itaconic anhydride, and fumaric acid may be reacted with abietic type rosin acids to yield $C_{24}$ or $C_{25}$ polycyclic tricarboxylic acids and anhydrides. Examples include the reaction product of levopimaric acid reacted with fumaric acid, i.e., fumaropimaric acid (I) and the product of levopimaric acid reacted with maleic anhydride, i.e., maleopimaric acid anhydride (II), as described in Kirk-Othmer, *Encyclopedia of Chemical Technology*, 3rd Edition, Vol. 20, Wiley-Inter-Science Publications, John Wiley & Sons, New York, 1978:

I.

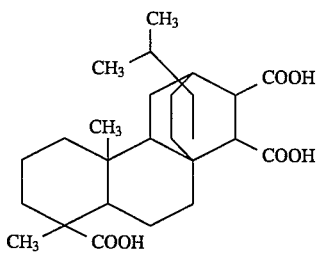

II.

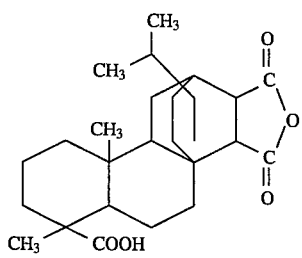

The water soluble resin of the present invention is produced by reacting a rosin modified sequentially by reaction first with a member selected from the group consisting of fumaric acid, maleic acid, maleic anhydride, itaconic acid, and itaconic anhydride and, second, with a hydroxyl-containing carboxypyrrolidinone derivative having the chemical structure

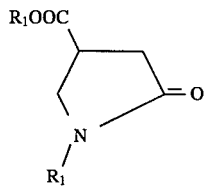

where $R_1$, independently, =H, $C_1$–$C_{20}$ hydrocarbyl, or $C_1$–$C_{20}$ hydroxyl-substituted hydrocarbyl; and at least one $R_1$ contains a hydroxyl group; or

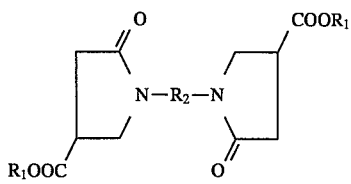

where $R_1$, independently, =H, $C_1$–$C_{20}$ hydrocarbyl, or $C_1$–$C_{20}$ hydroxyl-substituted hydrocarbyl; and at least one $R_1$ contains a hydroxyl group; and $R_2$=$C_1$–$C_{36}$ hydrocarbyl or $C_1$–$C_{36}$ hydroxyl-substituted hydrocarbyl.

The type of chemical structure formed will depend upon the number of primary amines and the number of hydroxyl groups contained in the respective reactants.

Hydroxyl-containing carboxypyrrolidinone derivatives which are suitable for use in the present invention are produced by reacting itaconic acid with a member of the group consisting of amines containing at least one primary amine group and at least one hydroxyl group (and combinations thereof).

An alternative method for producing hydroxyl-containing carboxypyrrolidinone derivatives which are suitable for use in the present invention is to 1) react itaconic acid with a member of the group consisting of amines containing at least one primary amine group and combinations thereof to produce a carboxypyrrolidinone, and 2) react the carboxypyrrolidinone with a member of the group consisting of polyols containing from 2–6 hydroxyl units and having a molecular weight in the range of about 62–600 and combinations thereof to produce the derivative.

Thus, it should be noted that a polyol reaction step is unnecessary where the amine contains sufficient hydroxyl groups to form a hydroxyl-containing carboxypyrrolidinone derivative when reacted with itaconic acid. It is well within the ability of one skilled in the art to determine whether a polyol reaction step is necessary to produce the desired derivative.

The condensation reaction should be carried out at a relatively low temperature (below about 235° C., preferably about 200° C.) so that reaction of the secondary carboxyls of the rosins is favored over the tertiary ones and to avoid chain branching. Since rosin typically cannot be fully maleated or fumarated, resin made by the above process will contain a certain amount of unreacted rosin, which acts as a plasticizer and reduces the softening point of the resin. The softening point can be increased either by using a rosin that has a relatively higher content of abietic-type rosin acids, such as gum rosin, and, thus, can be maleated or fumarated to a greater extent, or by using maleated or fumarated rosin that has been vacuum stripped to remove part of the unreacted rosin.

The resins of this invention may be combined with monomers to prepare acrylic latex compositions for use in formulating water-based flexographic and gravure printing inks. Monomers which are suitable for use in preparing these acrylic latex compositions include, but are not limited to, the following:

styrene,
α-methyl styrene,
vinyl toluene,
acrylic esters,
methacrylic esters,
methacrylic acid, and
mixtures thereof.

The following examples are provided to further illustrate the present invention and are not to be construed as limiting the invention in any manner.

EXAMPLE 1

To a 500 ml round-bottom flask equipped with a stirrer, thermometer, and reflux condenser were charged 150 ml of deionized water and 60 g (0.8 mole) of 1-amino-2-propanol. The charge was heated to 80° C., and 104 g (0.8 mole) of itaconic acid was added. The mixture was then refluxed for 1.5 hours. The reflux condenser was then replaced with a distillation head, and 130 ml of water was removed by distillation. A Snyder column was then placed between the flask and the distillation head, 60.8 g (0.8 mole) of propylene glycol and 0.5 dibutyltin oxide were added, and the distillation continued (maximum pot temperature 200° C., maximum column temperature 100° C.) until the product (a hydroxyl-containing carboxypyrrolidinone derivative) had an acid number of less than 10.

To a 1000 ml round-bottom flask fitted with a stirrer, thermometer, and nitrogen inlet was charged 400 g of tall oil rosin. The rosin was heated to 180° C. under a nitrogen blanket, and 100 g of fumaric acid was added. The mixture was heated to 200° C. and held there for three hours. Then 150 g of the above carboxypyrrolidinone derivative was added, and reaction was continued at 200° C. for four hours to give a resin (Resin No. 1) with an acid number of 162 and a ring-and-ball softening point of 108° C.

EXAMPLE 2

A series of resins were prepared using the procedure of Example 1 wherein the 1-amino-2-propanol was replaced with equimolar amounts of other various diamines. These resins (as well as Resin No. 1) are listed in Table I below.

TABLE I

Rosin Ester-Amide Support Resins

| Resin No. | Carboxypyrrolidinone Derivatives Parts per 100 Parts of Rosin* | Acid No. | S.P. °C. |
|---|---|---|---|
| 1 | 37.5 AP/Itaconic Acid/PG | 162 | 108 |
| 2 | 37.5 HDA/Itaconic Acid/PG | 192 | 113 |
| 3 | 37.5 DACH/Itaconic Acid/PG | 182 | 122 |
| 4 | 37.5 XDA/Itaconic Acid/PG | 189 | 118 |

*Resins also contain 25 parts per hundred rosin fumaric acid.
AP = 1-amino-2-propanol
DACH = 1,4-diaminocyclohexane
HDA = 1,6-hexamethylenediamine
XDA = 1,3-xylylenediamine The above-noted resins exhibited excellent characteristics, including solubility in aqueous bases, adhesion to polypropylene films, and hydrolytic stability.

The rosin ester-amides in Table I were used as support resins for formulating film-forming acrylic latex compositions via the following procedure. To a 2-liter four-neck distilling flask equipped with a mechanical stirrer was added 23.0 parts of rosin ester-amide support resin dissolved in 132.0 parts deionized water. The pH of this resin solution was set at about 8.5 with the required amount of ammonium hydroxide. To the resin mixture was added 5.0 parts of sulfated akylphenoxypoly (ethyleneoxy) ethanol surfactant in 11.7 parts water, and 3.0 parts octylphenoxypoly (ethyleneoxy) ethanol surfactant in 1.3 parts water. This mixture was heated under a nitrogen blanket to 85° C., at which time a monomer charge of 5.3 g of styrene and 4.7 g of butyl acrylate was added to the flask, followed by the addition of 0.44 parts ammonium persulfate in 1.3 parts deionized water. This initial charge of monomer was allowed to react for 30 minutes. Afterwards, a monomer charge of 57.7 g of styrene and 42.3 g of butyl acrylate was added over a period of 120 minutes. An additional 0.44 parts ammonium persulfate in 1.3 parts water was added 60 minutes into the addition of the remaining monomer. When the monomer was completely added the emulsion was held at 85° C. for 30 minutes and then 0.13 parts ammonium persulfate was added. The emulsion was stirred for 120 minutes at 85° C. before being cooled and filtered. The final pH was adjusted to 8.3–8.4 with the required amount of ammonium hydroxide. The properties of the acrylic latex compositions are shown in Table II below.

A series of water-based flexographic and gravure inks were prepared using these acrylic latex vehicles via the following formula (in percentage of total weight):

| | |
|---|---|
| Vehicle | 41.6 |
| Water | 16.0 |
| Isopropyl alcohol | 14.4 |
| FLEXIVERSE phthalo blue base (manufactured by Sun Chemical, Inc.) | 28.0 |

Prints from the inks were made on Mobil LCM treated, biaxially oriented polypropylene with a K-Coater using the KCC bar number 3, and subsequently dried in a forced air oven at 250° F. for 20–30 seconds. Morton laminating adhesive 77T623 was applied to the dried ink surface using the K-Coater and the number 3 bar. The adhesive was dried using the same conditions as for the ink. A sheet of 92 LBT. 12 gage polyester (manufactured by DuPont, Inc.) was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester. The results from the peel tests are listed in Table II below.

TABLE II

Acrylic Latex Composition Properties

| Resin No. | Latex No. | Solids, Wt % | pH | Viscosity, cP | Particle Size, nm | Peel Strength, g/inch |
|---|---|---|---|---|---|---|
| 1 | 1 | 46.3 | 8.5 | 58 | 65 | 361 |
| 2 | 2 | 42.9 | 8.1 | 664 | 58 | 337 |
| 3 | 3 | 43.5 | 8.5 | 62 | 111 | 332 |
| 4 | 4 | 46.0 | 8.4 | 63 | 52 | 394 |

The acrylic latex compositions produced via the present method were suitable for use in formulating water-based inks (that is, none of the latex compositions formed excessive grit). Furthermore, all the inks produced exhibited good-to-excellent peel strengths in plastic film laminates.

Many modifications and variations of the present invention will be apparent to one of ordinary skill in the art in light of the above teachings. It is, therefore, understood that the scope of the invention is not to be limited by the foregoing description, but rather is to be defined by the claims appended hereto.

What is claimed is:

1. An acrylic latex composition comprising the composition produced by polymerizing a monomer in the presence of a water-soluble resin reaction product of a rosin modified sequentially by reaction first with a member selected from the group consisting of fumaric acid, maleic acid, maleic anhydride, itaconic acid, and itaconic anhydride and, second, with a hydroxyl-containing carboxypyrrolidinone derivative having a chemical structure selected from the group consisting of

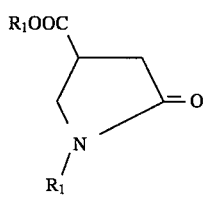

where $R_1$, independently, is a H, a $C_1$–$C_{20}$ hydrocarbyl, or a $C_1$–$C_{20}$ hydroxyl-substituted hydrocarbyl; and at least one $R_1$ contains a hydroxyl group, and

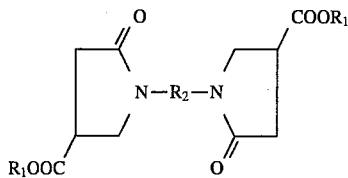

where $R_1$, independently, is a H, a $C_1$–$C_{20}$ hydrocarbyl, or a $C_1$–$C_{20}$ hydroxyl-substituted hydrocarbyl; and at least one $R_1$ contains a hydroxyl group, and $R_2$ is a $C_1$–$C_{36}$ hydrocarbyl or a $C_1$–$C_{36}$ hydroxyl-substituted hydrocarbyl.

2. The acrylic latex composition of claim 1 wherein the modified rosin is derived from the group consisting of tall oil rosin, gum rosin, and wood rosin.

3. The acrylic latex composition of claim 1 wherein the hydroxyl-containing carboxypyrrolidinone derivative is produced by reacting itaconic acid with a member of the group consisting of amines containing at least one primary amine group and at least one hydroxyl group, and combinations thereof.

4. The acrylic latex composition of claim 1 wherein the hydroxyl-containing carboxypyrrolidinone derivative is produced by 1) reacting itaconic acid with a member of the group consisting of amines containing at least one primary amine group and combinations thereof to produce a carboxypyrrolidinone, and 2) reacting the carboxypyrrolidinone with a member of the group consisting of polyols containing from 2–6 hydroxyl units and having a molecular weight in the range of about 62–600 and combinations thereof to produce the derivative.

5. The acrylic latex composition of claim 1 wherein the monomer is a member selected from the group consisting of styrene, α-methyl styrene, vinyl toluene, acrylic esters, methacrylic esters, methacrylic acid, and combinations thereof.

6. A water-based ink comprising the acrylic latex composition of claim 1 and a pigment dispersion.

* * * * *

UNITED STATES PATENT AND TRADEMARK OFFICE
CERTIFICATE OF CORRECTION

PATENT NO. : 5,498,653
DATED : March 12, 1996
INVENTOR(S) : G. Frederick Hutter

It is certified that error appears in the above-indentified patent and that said Letters Patent is hereby corrected as shown below:

In column 5, line 61, delete "57.7" and substitute therefor --47.7--.

Signed and Sealed this

Fourth Day of June, 1996

Attest:

BRUCE LEHMAN

*Attesting Officer*     *Commissioner of Patents and Trademarks*